United States Patent [19]

Hediger

[11] Patent Number: 4,641,770
[45] Date of Patent: Feb. 10, 1987

[54] ANGULARLY ADJUSTABLE WEB-SUPPORTING STEERING ROLLER

[75] Inventor: Edwin A. Hediger, Rochester, N.Y.

[73] Assignee: Eastman Kodak Company, Rochester, N.Y.

[21] Appl. No.: 727,942

[22] Filed: Apr. 26, 1985

[51] Int. Cl.$^4$ ............................................. B65H 23/02
[52] U.S. Cl. ........................................ 226/23; 226/21
[58] Field of Search ................... 226/19, 18, 17, 21, 226/23; 198/806, 807; 474/102, 103, 104

[56] References Cited

U.S. PATENT DOCUMENTS

| | | |
|---|---|---|
| 3,315,859 | 4/1967 | Owens, Jr. et al. . |
| 3,435,693 | 4/1969 | Wright et al. ............... 226/23 X |
| 3,540,571 | 11/1970 | Morse et al. . |
| 3,973,446 | 8/1976 | Vasilantone . |
| 3,986,650 | 10/1976 | Swanke et al. . |
| 4,174,171 | 11/1979 | Hamaker et al. . |
| 4,196,803 | 4/1980 | Lovett . |
| 4,344,693 | 8/1982 | Hamaker et al. . |
| 4,397,538 | 8/1983 | Castelli et al. . |

*Primary Examiner*—Stuart S. Levy
*Assistant Examiner*—Lynn M. Sohacki
*Attorney, Agent, or Firm*—Lawrence P. Kessler

[57] ABSTRACT

Mechanism for angularly adjusting a web-supporting steering roller of a web tracking apparatus about its steering axis in response to lateral movement of the supported web relative to the steering roller. In the web tracking apparatus, the web-supporting steering roller is mounted for rotation about its longitudinal axis and angular adjustment about a steering axis perpendicular to such longitudinal axis. The mechanism for angularly adjusting the steering roller comprises a lever assembly, for example, coupled to the steering roller for rotating such roller about the steering axis. Lateral movement of the web relative to the steering roller is sensed. A member, associated with the lever assembly and responsive to the sensing of lateral web movement, moves the lever assembly to rotate said steering roller for angular adjustment about the steering axis an amount corresponding to sensed lateral movement of the web. The member is located so that lateral movement of the web with the steering roller upon the angular adjustment of the roller is not imparted to the member.

8 Claims, 7 Drawing Figures

ANGULARLY ADJUSTABLE WEB-SUPPORTING STEERING ROLLER

BACKGROUND OF THE INVENTION

This invention relates in general to web tracking apparatus including a web-supporting steering roller, and more particularly to web tracking apparatus in which a web-supporting steering roller is responsive to lateral movement of the supported web relative to the steering roller for angular adjustment of such roller.

In high speed electrographic reproduction apparatus for example, it is common practice to employ an elongated dielectric belt or web traveling along a path in operative relation with electrographic process stations. Such stations produce transferable images on the web and transfer such images from the web to receiver sheets to produce desired reproductions. Typically the web is supported by, and driven about, at least one roller. If the web were of a perfect construction and the support roller were perfectly cylindrical and mounted for rotation about its longitudinal axis, the velocity vector of the web would be substantially normal to the longitudinal axis of the roller. However, in practice, the velocity vector of the traveling web frequently approaches the longitudinal axis of the roller at an angle which produces lateral movement of the web relative to the roller.

Various apparatus for correcting for the lateral (cross-track) movement of the web have heretofore been utilized. Such apparatus include for example crowned rollers, flanged rollers, or servo actuated steering rollers. However, crown or flanged rollers are not suitable for use with a web in an electrographic reproduction apparatus. Crown rollers force the web toward the apex of such rollers and cause distortion of the web thereby producing local stresses in the web at the crown. Such stresses can damage the web. Meanwhile flanged rollers produce concentrated loading at the edges of the web which result in edge buckling, seam splitting, or excessive edge wear. On the other hand, while servo actuated steering rollers are suitable for use in electrographic reproduction apparatus, they are generally complex and costly.

Recently self-activated steering rollers have been developed for use in electrographic reproduction apparatus. Such steering rollers are simpler in construction and less costly than the servo actuated steering rollers. Examples of web tracking apparatus employing self-activated steering rollers are shown in U.S. Pat. Nos. 3,435,693; 3,540,571; and 4,397,538. The apparatus of such patents respectively sense lateral movement of a web and convert such movement into corresponding adjustment of the steering roller. However, with the web supported on the steering roller, adjustment of the steering roller moves the web laterally and such movement is immediately reflected in further movement of the sensing mechanism and readjustment of the steering roller. This may result in significant over corrections in steering roller adjustment with undue back-and-forth lateral movement of the web as it is realigned.

SUMMARY OF INVENTION

This invention is directed to web tracking apparatus in which a web-supporting steering roller is responsive only to lateral movement of the supported web relative to the steering roller for angular adjustment. In the web tracking apparatus, the web-supporting steering roller is mounted for rotation about its longitudinal axis and angular adjustment about a steering axis perpendicular to such longitudinal axis. A mechanism for angularly adjusting the steering roller comprises a lever assembly, for example, coupled to the steering roller for rotating such roller about the steering axis. Lateral movement the web relative to the steering roller is sensed. A member, associated with the lever assembly and responsive to the sensing of lateral web movement, moves the lever assembly to rotate the steering roller for angular adjustment about the steering axis an amount corresponding to sensed lateral movement of the web. The member is located so that lateral movement of the web with the steering roller upon the angular adjustment of the roller is not imparted to the member. Particularly, the sensing of lateral movement of the web is accomplished by a disc including a spherical facial surface, an arc of such surface describing a line having all points equidistant from the steering axis. The lever assembly moving member engages the spherical facial surface at such arc.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENT

Figure 1:
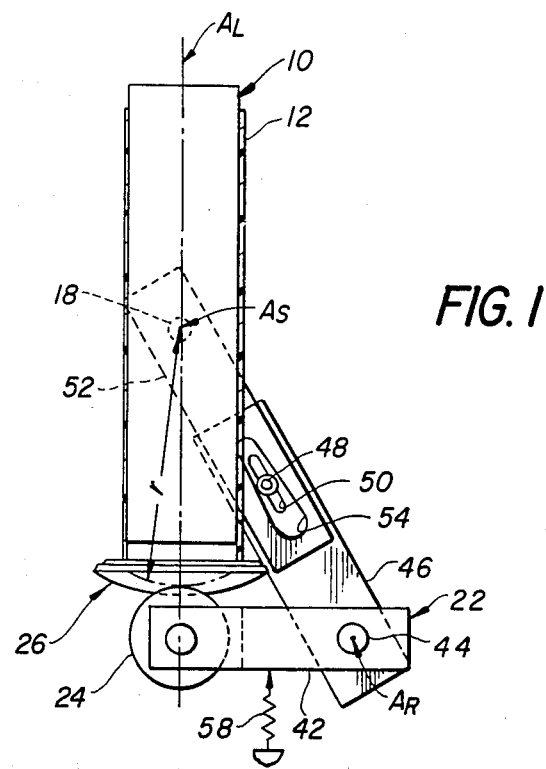
FIG. 1 is a top plan view of a web-supporting steering roller having a mechanism for effecting angular adjustment of such roller according to this invention.
Figure 2:
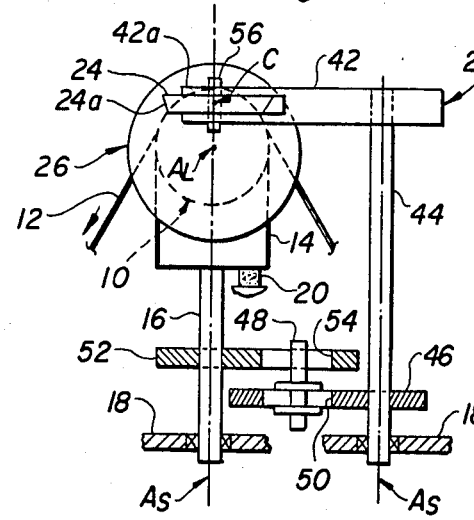
FIG. 2 is an end elevational view of the web-supporting steering roller and angular adjustment mechanism as shown in FIG. 1.
Figure 3:
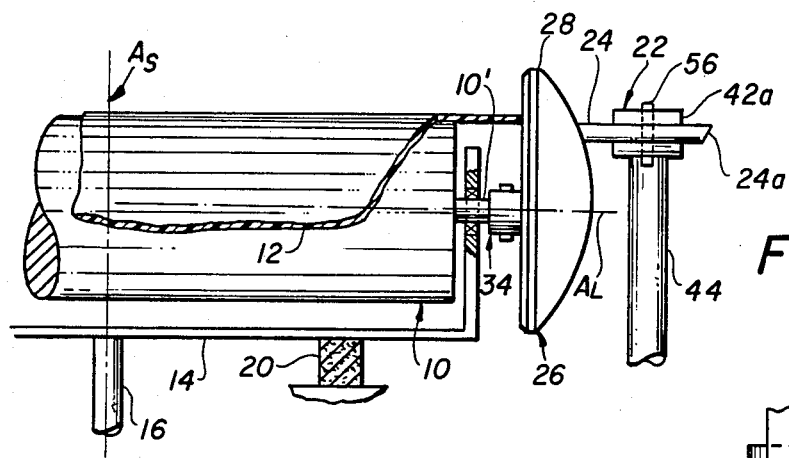
FIG. 3 is a side elevational view, on an enlarged scale, of a portion of the web-supporting steering roller and angular adjustment mechanism, with portions removed to facilitate viewing.

Referring now to the accompanying drawing, a steering roller 10 for supporting a traveling web 12 in a web tracking apparatus is best shown in FIGS. 1–3. The roller 10, of substantially cylindrical configuration, includes axles 10' (one shown in FIG. 3) supported by a yoke 14 for rotation of the roller about its longitudinal axis $A_L$. The yoke 14 is mounted on a post 16. The post 16 is supported for rotation in a frame 18 (FIG. 2) whereby the yoke, and thus the steering roller, are rotatable for angular adjustment about a steering axis $A_S$. A friction pad 20 engages the yoke 14 (FIG. 3) to provide a force opposing motion of the yoke about the steering axis. The magnitude of such force is selected to be sufficient to stabilize movement of yoke while allowing for its angular adjustment.

As discussed above, in web tracking apparatus there is a propensity for a traveling web to move relative to its supporting roller in a lateral (cross-track) direction. Angular adjustment of the web-supporting roller corresponding to such lateral web movement causes the traveling web to return to its desired tracking location. According to this invention, rotation of the steering roller 10 for angular adjustment about its steering axis $A_S$, based on lateral movement of the web 12, is accomplished by a mechanism including a lever assembly designated generally by the numeral 22. The lever assembly 22 is actuated by a member 24 associated with a web position sensing member designated generally by the numeral 26.

Figure 4:
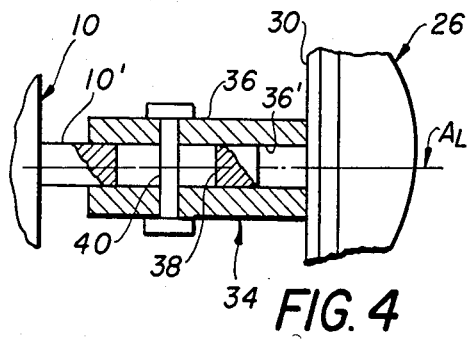
FIG. 4 is a side elevational view, on a further enlarged scale and partly in section, showing the structure for coupling a web position sensing member to the steering roller.
Figure 5:
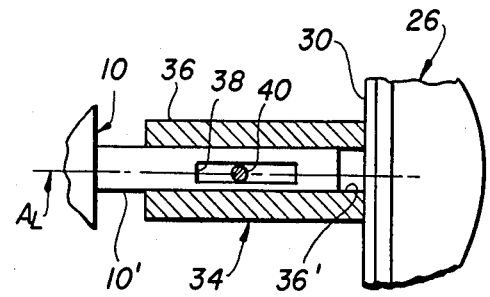
FIG. 5 is a top plan view, partly in section, of the structure of FIG. 4 on the same scale.

The web position sensing member 26 includes a disc 28 having a flat facial surface 30 and an opposed spherical facial surface. The disc 28 is coupled by mechanism 34 to one of the axles 10' for rotation with the steering roller 10 about its longitudinal axis $A_L$, and for reciprocation relative to the roller along its longitudinal axis. The coupling mechanism 34 includes a cylindrical sleeve 36 having an internal bore 36' adapted to be slidably received on an axle 10' (see FIGS. 4 and 5). The sleeve 36 is fixed to the surface 30 of the disc 28 with the longitudinal axis of the sleeve passing through the center of the disc. The axle 10' has a transverse slot 38 extending therethrough. A pin 40 connected to the sleeve 36 passes through the slot 38 when the sleeve is received on the axle 10'. The pin 40 transmits rotation of the steering roller 10 to the disc 28 and enables the disc to reciprocate along the longitudinal axis $A_L$ of the roller. The disc 28 is urged in a direction along the axis $A_L$ toward the steering roller 10 (in a manner to be explained hereinbelow) to engage a marginal edge of the web 12 and follow lateral movement of the web with respect to the roller.

As described, disc 28 rotates with the roller 10. Therefore there is substantially no relative movement between the marginal edge of the portion of the traveling web 12 entrained on the roller and the disc. Moreover, the web 12 is formed into a cylindrical shape over that portion of the web entrained on the steering roller. Therefore, the marginal edge of the web at such portion has considerable lateral strength (rigidity) for moving the disc 28 along the axis $A_L$. Accordingly, the marginal edge of the web will not be damaged by contact with the disc 28 of the web position sensing member 26.

Figure 7:
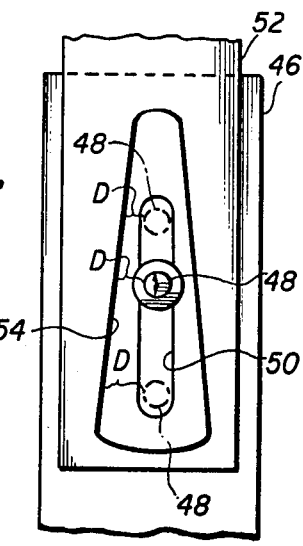
FIG. 7 is a plan view, on an enlarged scale, of a portion of the lever assembly of the angular adjustment mechanism showing the deadband coupling between levers of such assembly.

The lever assembly 22 includes a first lever 42, a second lever 46, and a third lever 52. The first lever 42 is fixed to a pivot rod 44 supported in frame 18. The rod 44 is rotatable about its longitudinal axis $A_R$. The second lever 46 is also fixed to the pivot rod 44. The second lever 46 carries a pin 48 adjustably located in a slot 50 in such lever. The third lever 52 is fixed to the yoke-supporting post 16. The lever 52 has a tapered slot 54 into which the pin 48 extends. As shown in FIG. 7, due to the taper of the slot 54 of lever 52 and adjustment of the location of the pin 48 in slot 50 of lever 46, the distance D that lever 46 has to move prior to the pin engaging the side wall of the tapered slot is adjustable (alternate positions of the pin 48 shown in phantom in FIG. 7). The purpose of adjustment of the distance D will be explained hereinbelow.

The lever 42 has a bifurcated end portion 42a carrying a pin 56 upon which the member 24 is supported for free rotation. A compression spring 58 (see FIG. 1) urges the lever 42 in a direction to bring the member 24 into engagement with the disc 28. In turn, the member 24 urges the disc 28 toward the web 12 to maintain engagement of the disc with the marginal edge of the web. The member 24 is a disc-like roller having a beveled edge 24a substantially complementary to the spherical facial surface of the disc 28 at the location where the member engages such surface. The location of such engagement is particularly selected to lie in a plane passing through the center of gravity C of that portion of the web engaging the roller 10. Therefore, a uniform loading is established on the marginal edge of the web by the disc 28. The disc thus readily follows the movement of such edge without damaging the edge. Moreover, the plane passing through the center of gravity C intersects the spherical facial surface of disc 28 in an arc describing a line having all points equidistant from the steering axis $A_S$. In this manner the point of engagement of the member 24 and the spherical facial surface of disc 28 (along such arc) is always an equal distance from the steering axis. Accordingly, movement of the disc 28 with the roller 10 when the roller is angularly adjusted about the steering axis $A_S$ does not impart movement to the member 24. Thus, when the web is moved laterally with the steering roller upon angular adjustment, further movement of the member 24 due to such angular adjustment is prevented.

Figure 6:
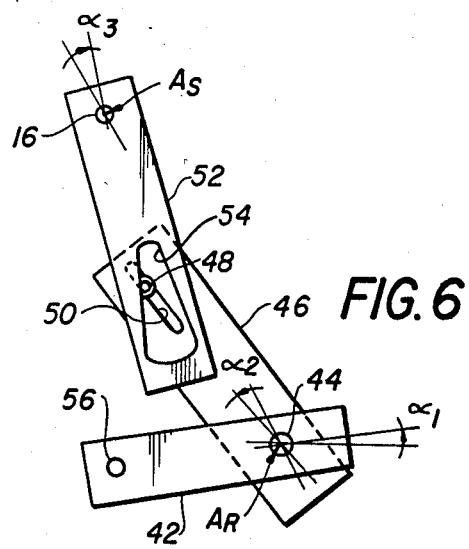
FIG. 6 is a top plan view of the lever assembly of the angular adjustment mechanism showing adjustment of the steering roller about its steering axis.

The angular adjustment of the steering roller 10 about the steering axis $A_S$ in response to lateral movement of the web relative to the steering roller is accomplished as follows. Lateral movement of the web 12 is sensed in the above-described manner by the web position sensing member 26. As an illustrative example, when the web 12 moves to the right (when viewed in FIG. 3) relative to the steering roller 10, the member 26 moves a corresponding distance to the right. The movement of member 26 causes member 24 to also move to the right pivoting lever 42 to rotate rod 44 about the axis $A_R$. Rotation of the rod 44 moves the lever 46 fixed to the rod a corresponding distance. As shown in FIG. 6, movement of the lever 42 about axis $A_R$ through an angle $\alpha_1$ causes lever 46 to move about axis $A_R$ through an angle $\alpha_2$, angles $\alpha_1$ and $\alpha_2$ being equal. Movement of lever 46 brings pin 48 into engagement with the side wall of slot 54 in lever 52 to move lever 52 about the steering axis $A_S$ through an angle $\alpha_3$. Since lever 52 is fixed to post 16, movement of such lever causes rotation of the post and thus a corresponding angular adjustment of the steering roller 10. Such angular adjustment of the roller causes the traveling web to move laterally with respect to the roller in a direction opposite to the initially sensed direction and bring the web back to its proper tracking location.

Due to the fact that pin 48 must move over the distance D (see FIG. 7) before contacting the side wall of slot 54, the angle $\alpha_3$ is less than the angle $\alpha_2$. As noted above adjustment of the pin 48 in slot 50 serves to set the particular distance D through which lever 46 moves before moving lever 52. This enables the lever assembly 22 to accommodate a preselected lateral movement of the web 12 before initiating angular adjustment of the steering roller 10. Therefore small deviations in the location of the lateral edge of the web (such as faults in the edge due to run out for example) do not result in continuous angular adjustments to the roller. If continuous adjustments were effected, steering corrections would be imparted to the web which are unnecessary and may in fact result in mistracking of the web if based upon a fault in the web edge.

The invention has been described in detail with particular reference to a preferred embodiment thereof, but it will be understood that variations and modifications can be effected within the spirit and scope of the invention.

I claim:

1. In a tracking apparatus for a traveling web including a steering roller supporting such web, said steering roller being mounted for rotation about its longitudinal axis and angular adjustment about a steering axis perpendicular to such longitudinal axis mechanism for angularly adjusting said steering roller about said steering axis in response to lateral movement of the supported web relative to said steering roller to correct tracking of such web, said mechanism comprising:

means coupled to said steering roller for rotating said steering roller about said steering axis;

means for sensing lateral movement of a supported web relative to said steering roller, said sensing means including a disc having a flat facial surface engagable with said web and an opposed spherical facial surface, an arc of said spherical facial surface describing a line having all points equidistant from said steering axis; and means, associated with said rotating means and responsive to said sensing means, for moving said rotating means to rotate said steering roller for angular adjustment about said steering axis an amount corresponding to sensed lateral movement of the web and thereby correct tracking of said web, said moving means including a follower member attached to said rotating means, said follower member engaging said spherical facial surface of said sensing means at said arc, whereby lateral movement of said web with said steering roller upon angular adjustment of said web with said steering roller upon angular adjustment of said roller is not imparted to said moving means.

2. The invention of 1 wherein said arc lies in a plane passing through the center of gravity of that portion of the web supported on said steering roller.

3. The invention of claim 1 wherein said rotating means includes a lever assembly having a first lever supporting said follower member, a rod rotatable about its longitudinal axis, said first lever fixed on said rod for rotating said rod in response to movement of said follower member, a second lever fixed on said rod for movement about such longitudinal axis with said first lever, a third lever fixed on said steering axis, and means for coupling said third lever to said second lever to pivot said third lever about said steering axis in response to pivoting of said second lever about said longitudinal axis.

4. The invention of claim 3 wherein said coupling means includes a tapered slot defined in said second lever, a pin extending from said third lever into said slot, and means for longitudinally adjusting the location of said pin relative to said tapered slot to establish a preselected distance of said pin from a sidewall of said tapered slot whereby said second lever moves a corresponding distance before pivoting said third lever.

5. Apparatus for controlling the lateral movement of a traveling web, said apparatus comprising:

a steering roller about which a traveling web is at least partially entrained;

means for supporting said steering roller for rotation about its longitudinal axis;

means for mounting said steering roller for angular adjustment about a steering axis perpendicular to such longitudinal axis at the mid-point of said steering roller;

a lever assembly coupled to said mounting means;

means for sensing lateral movement of a supported web relative to said steering roller in the direction of its longitudinal axis; and means, associated with said lever assembly and responsive to said sensing means, for moving said lever assembly to angularly adjust said steering roller about said steering axis an amount corresponding to sensed lateral movement of the web and thereby control tracking of said web, said moving means being located relative to said sensing means whereby lateral movement of said web with said steering roller upon angular adjustment of said roller is not imparted to said moving means.

6. The invention of claim 6 wherein said sensing means includes a disc having a flat facial surface engagable with said web and an opposed spherical facial surface, an arc of said spherical facial surface describing a line having all points equidistant from said steering axis; and wherein said moving means includes a follower member attached to said lever assembly, said follower member engaging said spherical facial surface at said arc.

7. The invention of claim 6 wherein said arc lies in a plane passing through the center of gravity of that portion of the web supported on said steering roller.

8. The invention of claim 6 wherein said lever assembly includes a first supporting said follower member, said first lever fixed on a rod rotatable about its longitudinal axis in response to movement of said follower member, a second lever fixed on said rod for movement about such longitudinal axis with said first lever, a third lever fixed on said steering axis, and means for coupling said third lever to said second lever to pivot said third lever about said steering axis in response to pivoting of said second lever about said longitudinal axis.

* * * * *